United States Patent
Mahoney et al.

(12) 
(10) Patent No.: US 6,772,945 B2
(45) Date of Patent: Aug. 10, 2004

(54) PRINTED CARD TO CONTROL PRINTER

(75) Inventors: Terry P. Mahoney, Boise, ID (US); Kenneth L. Oakeson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/973,253

(22) Filed: Oct. 9, 2001

(65) Prior Publication Data

US 2003/0066878 A1 Apr. 10, 2003

(51) Int. Cl.[7] ................................................. G06K 5/00
(52) U.S. Cl. ................... 235/380; 235/382; 235/382.5; 235/462.01; 235/462.04; 235/468; 235/462.07
(58) Field of Search ................................. 235/380, 382, 235/382.5, 462.01, 462.04, 462.07, 468

(56) References Cited

U.S. PATENT DOCUMENTS

| | | | | |
|---|---|---|---|---|
| 5,085,528 A | | 2/1992 | Sugino | 400/61 |
| 5,786,587 A | * | 7/1998 | Colgate, Jr. | 235/454 |
| 5,953,426 A | | 9/1999 | Windel et al. | 380/51 |
| 6,025,925 A | | 2/2000 | Davidson, Jr. et al. | 358/1.15 |
| 6,085,976 A | * | 7/2000 | Sehr | 235/380 |
| 6,087,955 A | * | 7/2000 | Gray | 235/379 |
| 6,104,809 A | * | 8/2000 | Berson et al. | 235/380 |
| 6,123,258 A | | 9/2000 | Iida | 235/375 |
| 6,168,081 B1 | * | 1/2001 | Urano et al. | 235/462.05 |
| 6,173,901 B1 | | 1/2001 | McCannel | 235/493 |
| 6,308,887 B1 | * | 10/2001 | Korman et al. | 235/379 |
| 6,328,209 B1 | * | 12/2001 | O'Boyle | 235/380 |

OTHER PUBLICATIONS

"Elements of a Bar Code System," Application Note 1013, Hewlett–Packard Co., pp. 1–35 (1996).

* cited by examiner

*Primary Examiner*—Steven S. Paik

(57) ABSTRACT

A system and method of controlling a printing operation using information printed on paper or similar material. Information data is input via an input processor, such as a computer, and the information data is converted to a descriptive indicia, which can be printed on a data card. The data card can be used with a peripheral device, such as a printer to allow access to a data, such as a print job.

17 Claims, 4 Drawing Sheets

PRINTED CARD TO CONTROL PRINTER

BACKGROUND

This invention relates to control of a printing process, typically including office and business type printers, commonly accessed by a variety of users. Recently, attempts have been made to improve the management of such printers through external controls. For example, many printers have been designed to receive a removable mechanical counter, which can be used to enable printing and which can be incremented every time a printing operation for one paper is completed. In this way, only authorized users who possess the mechanical counter can use the printer. Counting the number of printing operations facilitates billing for printer consumables.

In some printers, the mechanical counter is replaced with a removable data card. Typically, data cards include an encodable medium. The encodable medium, traditionally a magnetic strip, carries encoded information that is compatible with some form of indicia, either on the data card or stored in the memory of the printer, to allow access.

Another type of card, known as a "smart card," is a thin, credit card-sized piece of plastic that can contain an area consisting of gold contacts, which serve as the input/output system for the smart card. Internally, the card can contain a microprocessor, a combination of both RAM and ROM storage, and a type of operating system. Typically, there are algorithms dedicated to functions stored in the card's non-volatile memory. Many cards contain an additional numeric co-processor, which is dedicated to cryptographic functions. The smart card can be used to store and transport data to increase convenience to the holder, and reduce errors and cost of handling information.

Unfortunately, to provide a mechanical counter, a data card, or a smart card to the number of users that typically require the use of printers in a business environment can be costly. Moreover, mechanical counters and magnetic strips have limited durability. For example, mechanical counters and magnetic data cards can easily be misplaced or broken either by impact (e.g. being dropped) or by being subject to a magnetic field.

For these reasons, what is needed is a low cost, reliable device, which provides secure access to print data.

SUMMARY

The present invention provides a system and method of controlling a printing operation using information printed on paper or similar material. The present invention allows the user to input information data via an input processor, such as a computer, and have the information data converted to a descriptive indicia, which can be printed on a data card. The data card can be used with a peripheral device, such as a printer to allow access to a data, such as a print job.

In one aspect of the present invention, an information processing method is provided. The method includes receiving a data card including printed indicia descriptive of user information and data information; reading the indicia to use the user and data information to verify access credentials; and providing access to data in response to the verification.

In another aspect of the present invention, a system is provided for processing information. The system includes a processor capable of executing process steps. The processor reads indicia descriptive of user information and data information; verifies access credentials based on the indicia; and provides access to data in response to the verification.

In another aspect of the present invention, a system is provided for processing information. The system includes a computer operably coupled to an external peripheral device to form a network. The network is operable to receive a data card including indicia descriptive of user information and data information; read the indicia to use the user and data information to verify access credentials; and provide access to data on the basis of the verification.

These and other features of the invention will be apparent to persons of ordinary skill in the art upon reading the following description and figures.

BRIEF DESCRIPTION OF THE DRAWINGS

The use of the same reference symbol in different figures indicates the same or identical elements.

DETAILED DESCRIPTION

The detailed description that follows is presented largely in terms of processes and symbolic representations of operations performed by conventional computers and peripheral devices, such as file servers, printers and the like.

The computers and peripheral devices may advantageously contain program logic or other substrate configuration representing data and instructions, which cause the computers and peripheral devices to operate in a specific and predefined manner as, described herein. The program logic may advantageously be implemented as one or more modules. The modules may advantageously be configured to reside on memory in the computers and peripheral devices and execute on the one or more processors. The modules include, but are not limited to, software, firmware or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

It should be understood that manipulations within the processor are often referred to in terms of adding, processing, comparing, retrieving, playing, moving, searching, transmitting and the like, which are often associated with manual operations performed by a human operator. It is to be understood that no involvement of the human operator may be necessary, or even desirable. The operations described herein are machine operations performed in conjunction with the human operator or user that interacts with the computers and peripheral devices.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hardwired logic or programs stored in non-volatile memory, such as read-only memory (ROM).

Throughout this description, the embodiments and examples shown should be considered as exemplars, rather than limitations on the methods of the present invention.

Figure 1:
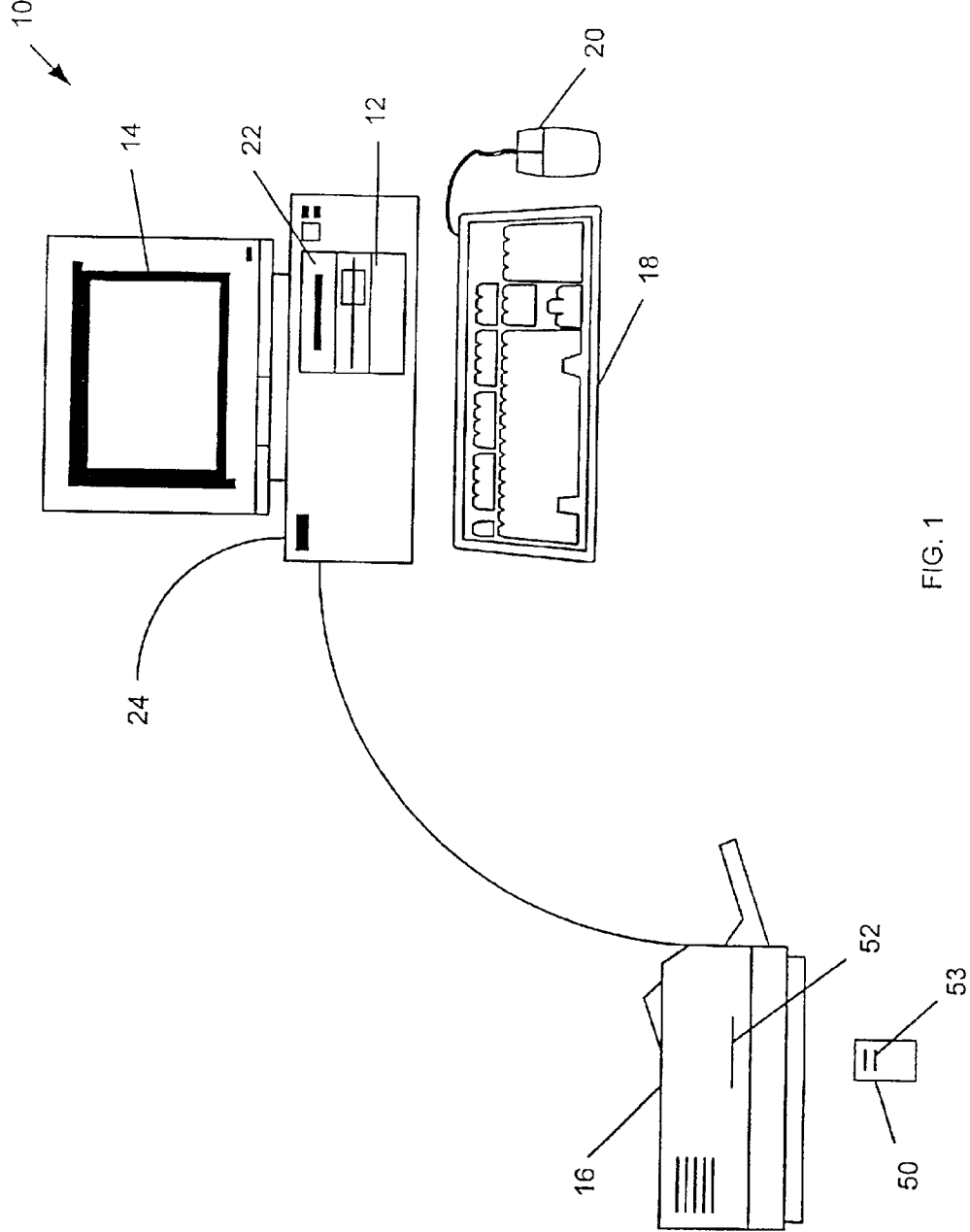
FIG. 1 is a simplified illustration of a computing system with a computer coupled to a printer.

FIG. 1 is a block diagram of a typical printing system 10, which includes a processor 12, such as a computer 12, a monitor 14, and a peripheral device 16, such as a printer 16. Monitor 14 may be a CRT type, a LCD type, or any other type of color or monochrome display. Printer 16 may be any type of printer, such as an inkjet printer, laser printer, thermal printer, dot matrix, or the like. Computer 12 is also provided with a keyboard 18 for entering text data and user commands, and a pointing device 20 for processing objects displayed on monitor 14.

Computer 12 includes a computer-readable memory medium such as a rotating disk for storing readable data. Besides other programs, the disk stores application programs by which computer 12 generates, manipulates, and stores files on the disk, displays data in those files on monitor 14, and prints data in those files via printer 16.

Device drivers are also stored on the disk. One of the stored device drivers can be a printer driver that includes computer-executable process steps according to the present invention. The printer driver provides a software interface to firmware in printer 16, to facilitate data transfer between computer 12 and printer 16.

Computer 12 can also access a computer-readable floppy disk storing data files, application program files, and computer executable process steps embodying the present invention or the like via the floppy disk drive 22. A CD-ROM interface (not shown) may also be provided with computer 12 to access application program files, device driver files and data files stored on a CD-ROM.

A modem, an integrated services digital network (ISDN) connection, or the like can also provide computer 12 with an Internet connection 24, which can provide access to, for example, the World Wide Web (WWW). The Internet connection 24 allows computer 12 to download device drivers, data files, image files, application program files, and computer-executable process steps embodying the present invention.

Figure 2:
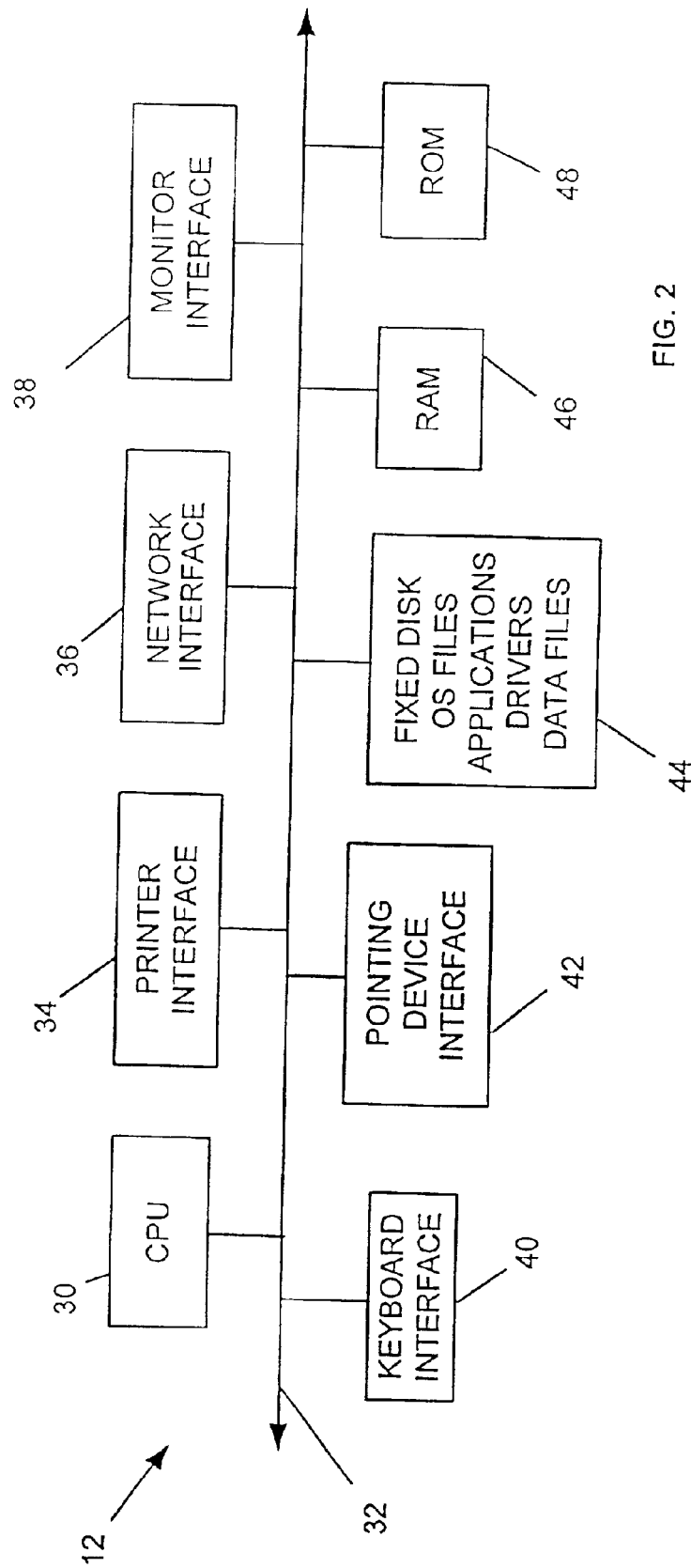
FIG. 2 is a block diagram of the architecture of the computer of FIG. 1.
Figure 3:
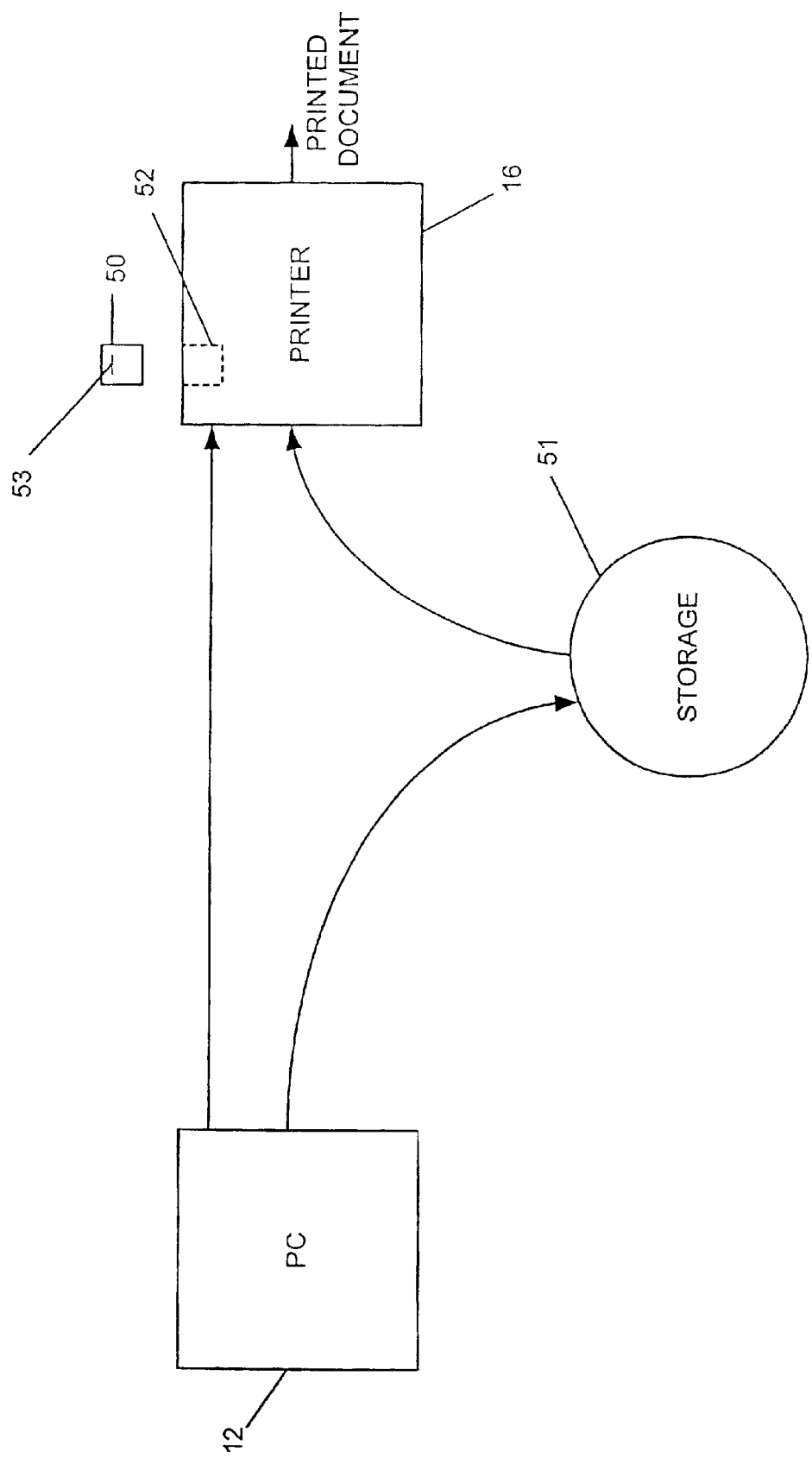
FIG. 3 is a simplified block diagram of a computer system in accordance with the present invention.

FIG. 2 is a block diagram showing the internal functional architecture of computer 12. As shown in FIG. 2, computer 12 includes CPU 30 for executing computer-executable process steps and interfaces with computer bus 32. Also shown in FIG. 2 are printer interface 34, network interface 36, display device interface 38, keyboard interface 40, pointing device interface 42 and disk drive 44.

As described above, disk drive 44 stores operating system program files, application program files, and device drivers, such as a printer driver for printer 16. Some of these files are stored on disk drive 44 using an installation program. For example, CPU 30 executes computer-executable process steps of an installation program so that CPU 30 can properly execute the application program.

A random access main memory ("RAM") 46 also interfaces to computer bus 32 to provide CPU 39 with access to memory storage. When executing stored computer-executable process steps from disk drive 44 (or other storage media such as floppy disk 22 or Internet connection 24, FIG. 1), CPU 30 stores those process steps in RAM 46 and executes the stored process steps out of RAM 46.

Read only memory ("ROM") 48 is provided to store invariant instruction sequences such as start-up instruction sequences or basic Input/output operating system (BIOS) sequences for operation of keyboard 18 (FIG. 1).

It should be understood that printer 16 can include a CPU, RAM, ROM and other features similar in function to those of computer 12, which may be necessary to perform and execute the process of the present invention.

Referring now to FIGS. 1 and 2, most windowing application programs, like Microsoft® Word® provide a print function to print a particular text file, image file, or other type of data file. Depending upon the application, a user can issue a print command to execute the print function using keyboard 18 and/or pointing device 20 (FIG. 1). Upon receiving such a print command, the application presents a print window to the user on monitor 14.

In one embodiment, upon selection of printer 16 and initiation of a print job, computer 12 transmits data to printer 16. In accordance with an embodiment of the present invention, a printed data card 50 can be inserted into a receiving portal 52 on printer 16. As described in greater detail below, information recorded on printed data card 50 allows access to the print job or may provide credentials that may be used for authorization and/or authentication. Printed data card 50 is encoded by printing information on the card, which is readable through a optical scanner, bar code reader or other similar device.

Data card 50 can be created on a temporary, semi-permanent or as needed basis. For example, data card 50 can be generated for individuals working on a particular project. Data card 50 would be encoded with information that would allow access for certain individuals to access documents stored on a particular storage location, such as storage location on either printer 16, computer 12 or a separate memory location 51. In the semi-permanent basis, data card 50 can be generated for employees of a particular unit, each having access to the employer's printer network. Because of the low cost associated with data card 50, the card may be replaced as often as necessary due to age or inadvertent damage. In the as-needed basis, data card 50 can be generated for a temporary user of a printer network, who is granted only limited access to the network.

In each of the above described basis for use, information regarding the user is entered into an application program that converts the information to an indicia 53 descriptive of the information. The indicia 53 can be printed-on a low cost, disposable material, such as paper sheets, card stock and the like. The printed-on indicia 53 can include, but is not limited to, information about the sender and recipient (if different from the sender) of the print job, credentials for authorization and authentication, information for decryption, identification of the print job so that the print job can be accessed at a later time from storage memory, and other information similar in nature. Data card 50 can also include a reference to the aforementioned information using, for example, a URL or Globally Unique ID (GUID).

The printed indicia 53 may or may not be visible. For example, the printed indicia 53 may be made of a known "invisible ink" that fluoresces in a light spectrum not visible to humans. In one embodiment, the indicia 53 can contain parts of different light reflectivity, (e.g., bar code symbols), which may be of the Universal Product Code (UPC) type or may be a customized type. Printer 16 can include a mechanism capable of reading the indicia 53. The mechanism can include, for example, a light source, such as a laser, which generates a light beam which can be optically modified and focused toward the indicia 53. A photodetector having a field of view extending across and slightly past the indicia can detect light of variable intensity reflected off the indicia and generate electrical signals indicative of the detected light. These electrical signals are decoded into instructions descriptive of the indicia. Mechanisms similar to that described above for reading indicia 53 are available from Agilent Technologies, Palo Alto, Calif. A general description of a bar code reading system is disclosed in "Elements of a Bar Code System," Hewlett-Packard Co., Application Note 1013 (1996), which is herein incorporated by reference for all purposes.

There are many variations on the use of data card 50. For example, data card 50 can be issued to a particular person by a particular authority. Thus the authority can be certain who and why a person has access to particular data. Also, the authority may desire to track the usage of a certain user or group of users. In another example, data card 50 can be created by a user in advance of creating a print job, so that a user can control access. In yet another example, a user can create data card 50 at print time, but handled separately from the print job (e.g., sent to a different printer). In this example, data card 50 can be authorized by a second user for the first user with his or her own data card 50, which the second user can cause to be created after entering a password.

Figure 4:
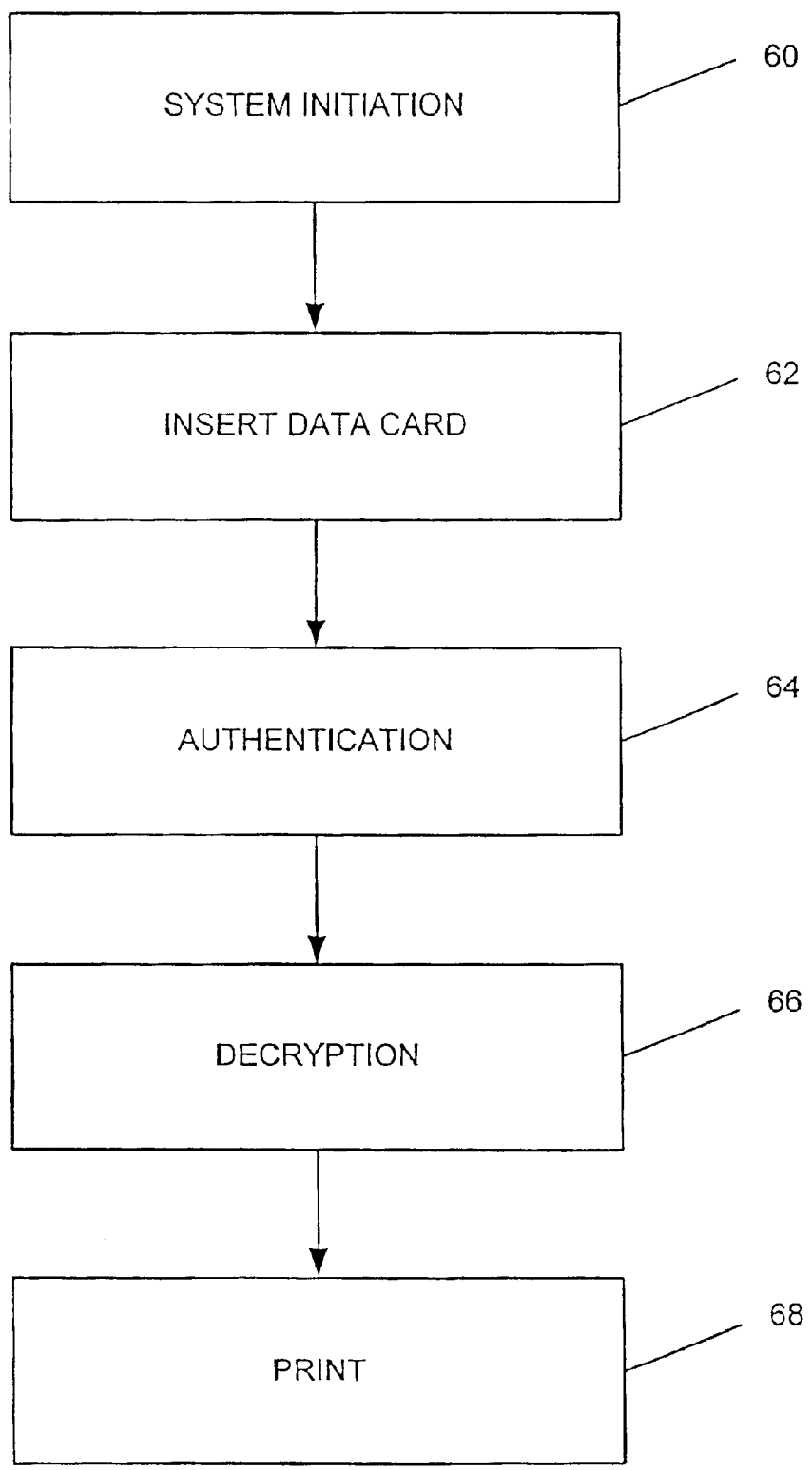
FIG. 4 is a simplified flow diagram of an embodiment of an information processing system in accordance with the present invention.

FIG. 4 is a simplified block diagram of a process in accordance with the present invention. Printing is established at computer 12 for all applications where printing is available, as an option, whenever the user initiates a job, for example, a print job from his or her computer 12. An application program can provide a print screen to input print commands either by keyboard 18 or by pointing device 20.

In action 60, a sender selects a print function from an application to print a document containing text or images from computer 12 to printer 16. For example, menu options are presented, which include the choice of selecting printer 16 either directly or through the network. Thus, in accordance with menu options, the user may select printer 16. The document data can be encrypted, using well-known encryption techniques, so that the data is protected from unauthorized access. For example, a public-private key system (e.g., SPKI—Simple Public Key Infrastructure—a IETF draft), can be implemented. In this example, the print system on computer 12 can encrypt the print job using the public key. Data card 50 can include a private key, which allows printer 16 to decrypt the print job. Alternatively, a print job would not have to be encrypted if the connection between the printing system on computer 12 and printer 16 is secure. Encrypted data can be transmitted to printer 16 or storage location 51.

In action 62, a recipient who has been issued data card 50, can insert the data card into receiving portal 52 on printer 16, or alternatively, swipe the card through a slot or pass the card over a reader window. In an alternative embodiment, receiving portal 52 can be a stand-alone mechanism operably coupled to printer 16. Insertion of data card 50 into portal 52 begins the process by which the printed indicia 53 is scanned or read by a reading mechanism, such as a bar code scanner, optical reader and the like.

In action 64, a comparison can be made between the printed indicia 53 on data card 50 to electronic source data designated for the card. Any discrepancy can cause a denial of access to the print job. The source data can be data permanently stored in a data file for the purpose of providing the basis of comparison. Alternatively, the source data can include customized information that a sender requires the recipient to possess in order to access a print job. For example, a sender can create data card 50 for a recipient that includes indicia 53 for an ID number known only to the sender. Thus, only recipients who possess the customized data card 50 can have access to the sender's print job.

In action 66, if access to the print job is allowed, the previously encrypted data is decrypted and the document can be printed (Action 68).

In one embodiment, statistical data can be collected and attributed to the sender (or recipient or both) for accounting purposes during printing (Action 68). For example, job processing time, paper usage (size, color and the like), number of one-sided or two-sided impressions, port identifier, network identifier, printer's serial number and the like can be collected to aid supply purchasers and maintenance teams.

While specific embodiments of this invention have been described, it is to be understood that these embodiments are illustrative and not limiting. Many additional embodiments that are within the broad principles of this invention will be apparent to persons skilled in the art.

What is claimed is:

1. An information processing method for a user of a printer in a printing system in a business environment for access to data to be printed by said printer in a network having a plurality of printers and a plurality of input devices enabling access to a printer of said plurality of printers comprising:

providing user information at a first location in said network using an input device at said first location in said network;

receiving a data card comprising a low cost disposable material consisting of one of a paper sheet and a piece of card stock by a user by the printing of said data card at a first location using a first printer of said plurality of printers in a business system for facilitating the billing for printer consumables for use of said printer by a user of said printer, said data card including printed indicia descriptive of user information of at least one of information about a sender of said data and information about a recipient for said data and data information of at least one of credentials for authorization of a print job, credentials for authentication of a print job, information for decryption of a print job, and information for identification of a print job, said printed indicia comprising access credentials for access to said data;

reading said printed indicia to use said user information and data information to verify said access credentials at any desired printer at any desired location of a printer of said plurality of printers in said printing system in a business environment;

providing access to said data to said recipient in response to said access credentials that have been verified;

printing said data using any desired printer of said plurality of printers in said printing system in a business environment at any second location in said network different than said first location in said network; and collecting statistical data of the location of the printer of said plurality of printers in said printing system used for printing said data.

2. The method of claim 1, wherein said indicia comprises a series of printed ink bar code symbols.

3. The method of claim 1, wherein said indicia comprises a substance non-visible in the human visible light spectrum.

4. The method of claim 1, wherein said indicia comprises a series of user customized symbols.

5. The method of claim 1, wherein said data information comprises identification of the data and the source of the data.

6. The method of claim 1, wherein said providing access to data in response to said verification comprises decrypting said data.

7. The method of claim 1, wherein said user information comprises information regarding the identification of the sender and the identification of a recipient.

8. A system for processing information in a network having a plurality of processors and having a plurality of printers in a printing system in a business environment for a user of a printer for access to data to be printed by said printer comprising:

a processor located at a first location in said network capable of executing the following process:

providing a printed card comprising a low cost disposable material consisting of one of a paper sheet and a piece of card stock;

reading indicia from the printed card descriptive of user information of at least one of information about a sender of said data and information about a recipient for said data and data information of at least one of credentials for authorization of a print job, credentials for authentication of a print job, information for decryption of a print job, and information for identification of a print job, said indicia comprising access credentials for access to said data;

verifying said access credentials based on said indicia;

providing access to data in response to said verification of said access credentials for access to said data;

printing of said data at any printer located at a second location in said network different than said first location of said processor; and collecting statistical data of the location of a printer of said plurality of printers in said printing system used for printing said data.

9. The system of claim 8, wherein said indicia comprises a series of printed ink bar code symbols printed on a data card.

10. The system of claim 8, wherein said indicia comprises a substance non-visible in the human visible light spectrum.

11. The system of claim 8, wherein said user information comprises information regarding the identification of a sender and a recipient.

12. The system of claim 8, wherein said data information comprises identification of the data and the source of the data.

13. The system of claim 8, wherein said data comprises an ink print job information.

14. The system of claim 8, wherein said providing access to data in response to said verification comprises decrypting said data.

15. A system for processing information for a user of a printer in a printing system in a business environment for access to data to be printed by said printer comprising:

a computer located at a first location operably coupled to an external peripheral device to form a network having a plurality of computers and having a plurality of printers connected thereto, said network being operable to:

receive a data card comprising a low cost disposable material consisting of one of a paper sheet and a piece of card stock, said data card including printed indicia descriptive of user information of at least one of information about a sender of said data and information about a recipient for said data and data information of at least one of credentials for authorization of a print job, credentials for authentication of a print job, information for decryption of a print job, and information for identification of a print job, said indicia comprising access credentials for access to said data;

read said indicia to access said user information and data information for verifying said access credentials;

provide access to said data on the basis of said verifying said access credentials;

printing of said data at any printer located at a second location in said network different than said first location of said computer; and collecting statistical data of the location of the printer in said printing system used for printing said data.

16. The system of claim 15, wherein said peripheral device is a printer.

17. The system of claim 15, wherein said network is further operable to decrypt said data.

\* \* \* \* \*